United States Patent
Hirao

(10) Patent No.: US 9,251,443 B2
(45) Date of Patent: Feb. 2, 2016

(54) PRINTING APPARATUS THAT SELECTS PAPER TRAY WITH PRIORITY BASED ON PRESENCE OR ABSENCE OF SENSOR

(71) Applicant: CANON KABUSHIKI KAISHA, Tokyo (JP)

(72) Inventor: Toyomi Hirao, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/908,360

(22) Filed: Jun. 3, 2013

(65) Prior Publication Data

US 2013/0329241 A1    Dec. 12, 2013

(30) Foreign Application Priority Data

Jun. 7, 2012 (JP) ................. 2012-129886

(51) Int. Cl.
  *G03G 15/00*   (2006.01)
  *G06K 15/16*   (2006.01)
  *H04N 1/00*    (2006.01)

(52) U.S. Cl.
  CPC ............ *G06K 15/16* (2013.01); *G03G 15/6508* (2013.01)

(58) Field of Classification Search
  CPC .......... H04N 1/00684; H04N 1/00687; H04N 1/00689; H04N 1/00692; H04N 1/00694; H04N 1/00697; H04N 1/00681; G06K 15/16; G03G 15/6508
  USPC ............. 271/3.01, 3.13, 3.14, 3.17, 265.01; 358/1.12; 399/393
  See application file for complete search history.

(56) References Cited

U.S. PATENT DOCUMENTS

| | | | |
|---|---|---|---|
| 4,538,906 A * | 9/1985 | Brown ................ | 399/391 |
| 6,000,870 A * | 12/1999 | Koga ................ | 400/605 |
| 2002/0063870 A1* | 5/2002 | Narasimhan ........ | 358/1.2 |
| 2008/0048392 A1* | 2/2008 | Hamahashi ........ | 271/265.01 |
| 2010/0172679 A1* | 7/2010 | Lee ................ | 399/405 |

FOREIGN PATENT DOCUMENTS

JP    11-301047 A    11/1999

* cited by examiner

*Primary Examiner* — Eric A Rust
(74) *Attorney, Agent, or Firm* — Canon USA, Inc. IP Division

(57) ABSTRACT

In a printing apparatus including two types of sheet storage unit, one capable of detecting a size of a sheet and the other not capable of detecting a size of a sheet, a possibility of outputting a print product which is not intended by a user is reduced. A method for controlling a printing apparatus includes feeding a sheet from a first sheet storage unit, feeding a sheet from a second sheet storage unit, and performing control to feed a sheet in such a way that a sheet is fed preferentially from a second sheet storage unit which is provided with a sensor for detecting a size of a sheet rather than from a first sheet storage unit which is not provided with a sensor for detecting a size of a sheet based on whether each sheet storage unit is provided with a sensor.

7 Claims, 13 Drawing Sheets

FIG. 8A

| NUMBER OF STORAGE UNITS | | | | |
|---|---|---|---|---|
| 3 | | | | |
| STORAGE UNIT ID | SHEET SIZE | REMAINING SHEET AMOUNT | SIZE DETECTION ABILITY | STORAGE UNIT TYPE |
| 1 | A4 | 50 | 0 | 0 |
| 2 | A5 | 100 | 0 | 0 |
| 3 | 0 | 0 | 0 | 1 |

FIG. 8B

| NUMBER OF STORAGE UNITS | | | | |
|---|---|---|---|---|
| 5 | | | | |
| STORAGE UNIT ID | SHEET SIZE | REMAINING SHEET AMOUNT | SIZE DETECTION ABILITY | STORAGE UNIT TYPE |
| 1 | A4 | 50 | 0 | 0 |
| 2 | A5 | 100 | 0 | 0 |
| 3 | 0 | 0 | 0 | 1 |
| 4 | B5 | 100 | 1 | 0 |
| 5 | A4 | 50 | 1 | 0 |

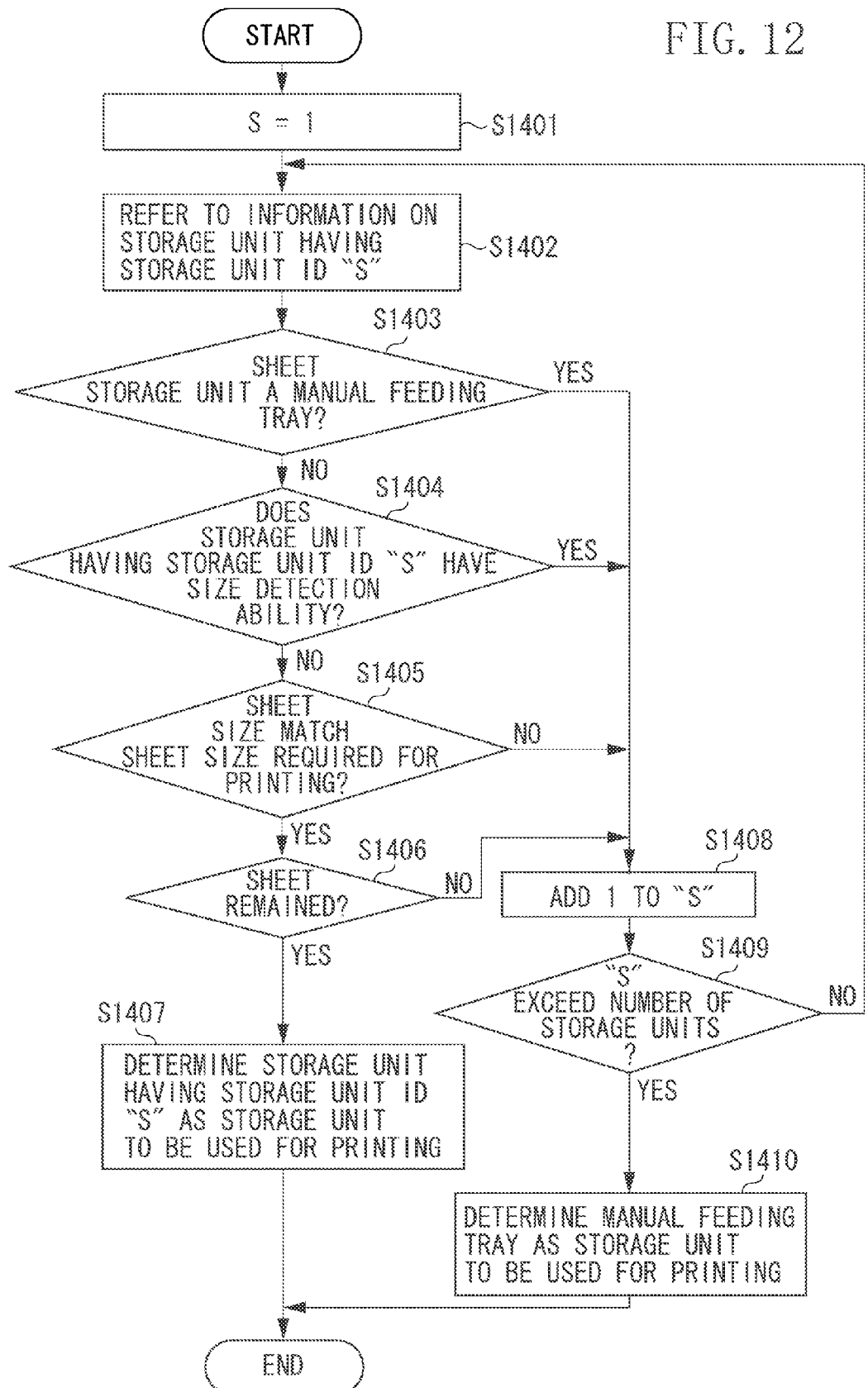

PRINTING APPARATUS THAT SELECTS PAPER TRAY WITH PRIORITY BASED ON PRESENCE OR ABSENCE OF SENSOR

BACKGROUND OF THE INVENTION

1. Field of the Invention

The present invention relates to a printing apparatus, a method for controlling the printing apparatus, and a storage medium.

2. Description of the Related Art

Conventionally, a printing apparatus includes a plurality of sheet storage units and conveys a sheet from one of the sheet storage units for printing an image on the conveyed sheet.

Some of these printing apparatuses have an automatic sheet selection function. The automatic sheet selection function refers to a function that finds a sheet storage unit which stores sheets of desired size for printing from among the sheet storage units and selects the found sheet storage unit as a sheet storage unit to be used for printing. For example, Japanese Patent Application Laid-Open No. 11-301047 discusses a printing apparatus which assigns priority to each of a plurality of sheet storage units, and the printing apparatus checks the sheet storage units, beginning with the highest-priority sheet storage unit, to determine whether sheets of a desired size for printing are stored.

Such a printing apparatus conveys a sheet from a sheet storage unit selected by the automatic sheet selection function, and prints an image on the conveyed sheet.

A sheet conveyance distance from a plurality of sheet storage units to an image forming unit of a print engine varies according to the respective sheet storage units. For higher printing productivity, a conventional printing apparatus preferentially selects a sheet storage unit nearer to the image forming unit.

Conventional sheet storage units are classified into two types. One type of sheet storage unit includes a sensor that can detect the size of stored sheets, and the other type of sheet storage unit cannot detect the size of stored sheets. Each type of sheet storage unit has advantages and disadvantages.

A sheet storage unit that can detect the size of stored sheets detects the size of a sheet by the sensor and eliminates the need for a user to specify the size of sheets that are set in the sheet storage unit. However, an additional cost is required for installation of the sensor in the printing apparatus.

On the other hand, a sheet storage unit that cannot detect the size of stored sheets requires the user to manually specify the size of sheets that are set in the sheet storage unit. However, the cost of the printing apparatus can be kept low since there is no need for installing the sensor.

Some printing apparatuses include both of the two types of sheet storage units described above.

For example, one is a sheet storage unit originally equipped in the printing apparatus and includes no sensor therein, and the other is a sheet storage unit which is added as an optional device and includes a sensor for detecting the size of a sheet.

In such a printing apparatus, the originally equipped sheet storage unit is nearer to the image forming unit. This means that the automatic sheet selection function preferentially selects the sheet storage unit which cannot detect the size of stored sheets as a sheet storage unit to be used for printing. However, because a user manually specifies size information for a sheet storage unit that cannot detect the size of stored sheets, the user may sometimes make a mistake in setting the information. A mismatch between the size information set to the sheet storage unit and the size of an actually stored sheet produces an unintended print result such as an occurrence of an image defect or printing of a smaller image in relation to the size of the sheet.

One possible solution to this issue is to make a setting to remove the sheet storage unit which cannot detect the size of stored sheets from a selectable target of the automatic sheet selection function. However, such a setting reduces the number of selectable targets by the automatic sheet selection function, and may increase a possibility that printing will stop because no sheet for printing is found.

SUMMARY OF THE INVENTION

According to an aspect of the present invention, a printing apparatus includes a first sheet storage unit which is not provided with a sensor for detecting a size of a sheet, a second sheet storage unit which is provided with a sensor for detecting a size of a sheet, and a control unit configured to perform control to feed a sheet in such a way that a sheet is fed preferentially from the second sheet storage unit provided with the sensor for detecting a size of a sheet based on whether the sensor is provided.

Further features of the present invention will become apparent from the following description of exemplary embodiments with reference to the attached drawings.

BRIEF DESCRIPTION OF THE DRAWINGS

FIGS. 8A and 8B illustrate tables that manage size information about sheet feeding cassettes according to the exemplary embodiment.

FIG. 12 is a flowchart illustrating an example of processing according to the exemplary embodiment.

DESCRIPTION OF THE EMBODIMENTS

Various exemplary embodiments, features, and aspects of the invention will be described in detail below with reference to the drawings.

Figure 1:
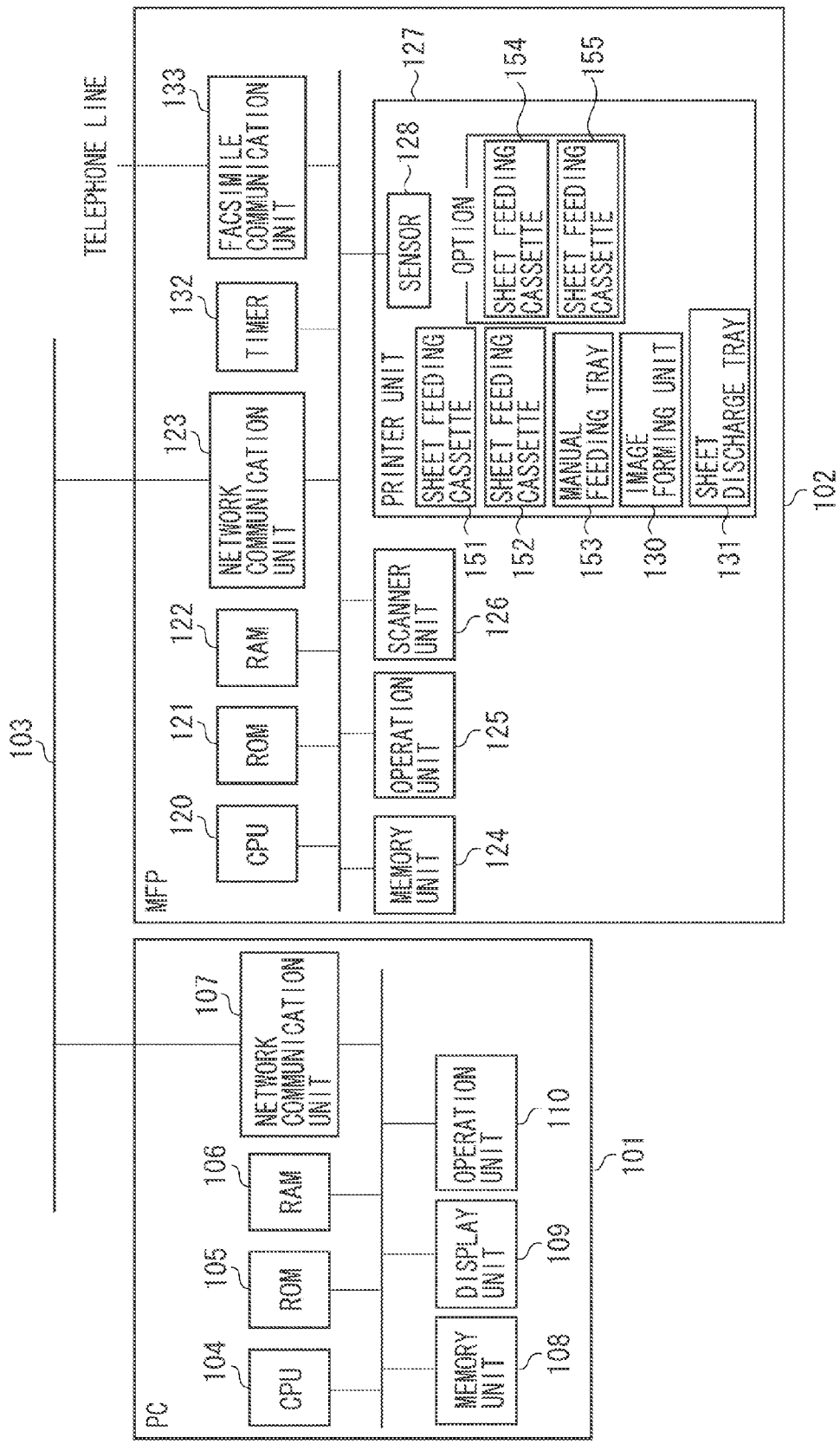
FIG. 1 illustrates an example of a configuration of a printing system according to an exemplary embodiment.

FIG. 1 illustrates an example of a configuration of a printing system according to an exemplary embodiment of the present invention.

The printing system according to the present exemplary embodiment includes a personal computer (PC) 101 which is an example of an external device, and a multifunction peripheral (MFP) 102 which is an example of a printing apparatus. The PC 101 and the MFP 102 are connected via a network 103. The network 103 may be a wired local area network (LAN), a wireless LAN, or the Internet.

The PC 101 includes a central processing unit (CPU) 104, a read only memory (ROM) 105, a random access memory (RAM) 106, a network communication unit 107, a memory unit 108, a display unit 109, and an operation unit 110.

The CPU 104 reads a program (for example, document creation application, and/or a printer driver) from the ROM 105 for execution. The RAM 106 is used as a work area of the CPU 104.

The network communication unit 107 performs interface control of data transmitted and received via the network 103.

The memory unit 108 is a nonvolatile memory, and stores image data created by document creation application.

The display unit 109 may include a liquid crystal display or a cathode ray tube (CRT) display, and display various operation screens and messages.

The operation unit 110 may include a keyboard or a mouse, and receives an operation performed by the user on the PC 101.

The PC 101 with the configuration described above generates print data by the printer driver according to image data created by the document creation application, and transmits to the MFP 102 via the network 103 the generated print data together with print settings for the generated print data. The PC 101 also receives status information about the MFP 102 and a print result from the MFP 102 and displays the received status information and the print result on the display unit 109.

The MFP 102 includes a CPU 120, a ROM 121, a RAM 122, a network communication unit 123, a memory unit 124, an operation unit 125, a scanner unit 126, and a printer unit 127.

The CPU 120 reads a program from the ROM 121 and comprehensively controls the MFP 102 by executing the read program. The RAM 122 is used as a work area of the CPU 120.

The network communication unit 123 performs interface control of data transmitted and received via the network 103.

The scanner unit 126 reads a document placed on a document positioning plate, and outputs image data indicating the image of the document that has been read. The scanner unit 126 includes an automatic document feeder (ADF), conveys a plurality of documents placed on the ADF one at a time, and reads an image of the conveyed documents.

The memory unit 124 stores the image of a document read by the scanner unit 126, and print data and a print setting received from the PC 101. The memory unit 124 also stores image data generated by rasterizing the print data.

The operation unit 125 includes hard keys and a touch panel. The touch panel includes a liquid crystal display and a touch panel sheet pasted on the liquid crystal display. The operation unit 125 displays various messages to a user on the touch panel. The operation unit 125 also receives an operation instruction from the user via the hard keys and the touch panel.

The printer unit 127 feeds a sheet from a sheet feeding cassette according to an instruction from the CPU 120 and prints an image on the sheet that has been fed.

The printer unit 127 includes a sensor 128, a sheet feeding cassette 151, a sheet feeding cassette 152, a manual feeding tray 153, an image forming unit 130, and a sheet discharge tray 131. The sheet feeding cassette 151, the sheet feeding cassette 152, and the manual feeding tray 153 store sheets to be used for printing.

The printer unit 127 may add a sheet feeding cassette 154 and a sheet feeding cassette 155 as an option thereto.

The sheet feeding cassette 151, the sheet feeding cassette 152, and the manual feeding tray 153 which are installed in the MFP 102 at the time of shipment from the factory, do not include a size detection sensor that can detect the size of stored sheets.

On the other hand, the sheet feeding cassette 154 and the sheet feeding cassette 155 which are added as an option include a size detection sensor that can detect the size of stored sheets.

The CPU 120 uses a sensor 128 to detect whether the optional sheet feeding cassettes 154 and 155 are connected. The mechanism for detecting whether an optional sheet feeding cassette is connected adopts a method such as a loop-back detection method based on an electrical signal or a hardware-based detection method such as a dongle.

In the description below, the sheet feeding cassette 151, the sheet feeding cassette 152, the manual feeding tray 153, the sheet feeding cassette 154, and the sheet feeding cassette 155 are sometimes referred to as sheet storage units.

The image forming unit 130 forms an image on a sheet fed and conveyed from a sheet storage unit.

The sheet discharge tray 131 is a tray on which sheets on which an image are formed by the image forming unit 130 are stacked.

The MFP 102 can perform a plurality of types of jobs such as a copy job, a print job, and a facsimile job.

When performing a copy job, the CPU 120 generates a job upon receiving a print start instruction from the operation unit 125. At this time, if a print layout or a print ratio is specified via the operation unit 125, the CPU 120 generates a job according to the print settings. The CPU 120 instructs the scanner unit 126 to read a document and stores image data which indicates the image of the document read by the scanner unit 126 in the memory unit 124. Then, the CPU 120 transmits the image data stored in the memory unit 124 to the printer unit 127 and causes the printer unit 127 to perform printing based on the image data.

When performing a print job, the CPU 120 receives print data (page description language (PDL) data) and print settings from the PC 101 via the network communication unit 123 and stores the received print data and the print settings in the memory unit 124 as a print job. Then, the CPU 120 reads the print data and the print settings corresponding to each print job from the memory unit 124, rasterizes the print data into image data according to the print settings, and causes the printer unit 127 to perform printing based on the rasterized image data.

When performing a facsimile job, the CPU 120 stores image data received from an external device via a facsimile communication unit 133 in the memory unit 124. In addition to the received image data, the CPU 120 stores document information. The document information includes a document identification (ID) uniquely identifying the image data, the number of pages of the document, a coding system, and a reception time. Then, the CPU 120 causes the printer unit 127 to perform printing based on the received image data.

Although an MFP is described as an example of a printing apparatus according to the present exemplary embodiment, the printing apparatus may be a single functional peripheral (SFP) that has only the facsimile function.

Figure 2:
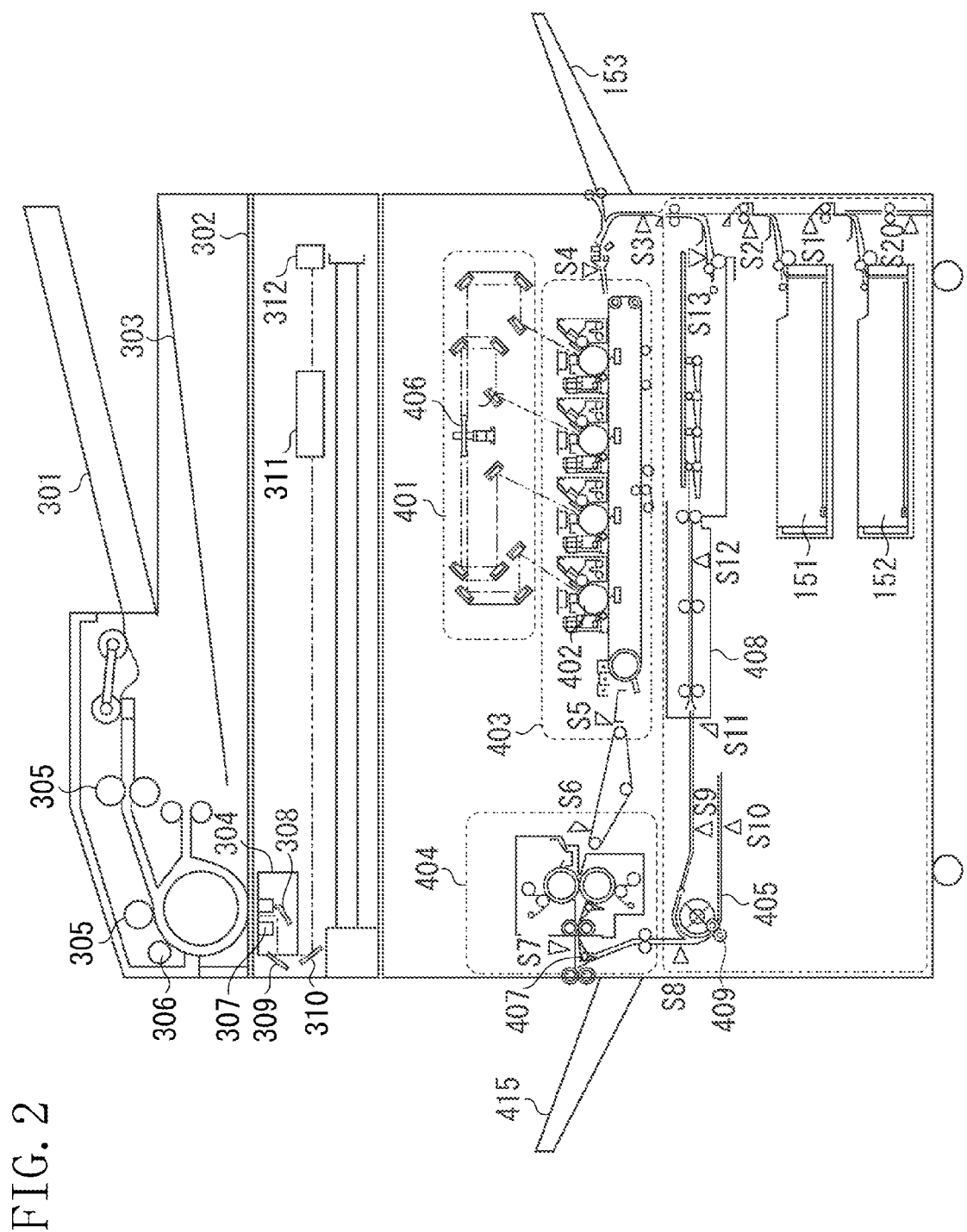
FIG. 2 illustrates a printing apparatus according to the exemplary embodiment.

Next, a configuration of the MFP 102 is described with reference to the cross section of the MFP 102 illustrated in FIG. 2.

The scanner unit 126 of the MFP 102 includes an automatic document feeder (ADF) 301. Documents stacked on the automatic document feeder (ADF) 301 are sequentially conveyed to a platen glass 302 one at a time from the first document in the order in which the documents are stacked. Then, each document is scanned on the platen glass 302 and is discharged onto a discharge tray 303.

On a document conveyance path along which a document is guided, conveyance rollers 305 that are driven by a stepping motor and a document detection sensor 306 that detects a leading edge and a trailing edge of a document are provided.

The document stacked on the automatic document feeder 301 passes through a document feeding-reading position at a constant speed by the conveyance rollers 305 driven by the stepping motor. In this case, an optical unit 307 moves to the document feeding-reading position and illuminates the document conveyed at the constant speed with a light source. The reflected light from the document is guided to a charge coupled device (CCD) image sensor (hereinafter referred to as CCD) 312 via a plurality of mirrors 308, 309, and 310 and a lens 311. Accordingly, the CCD 312 reads the image of the scanned document. The CCD 312 reads the image as needed to generate image data of each color (red (R), green (G), and blue (B)). The image data is transferred to the memory unit 124 for storing and printing.

The printer unit 127 includes four developing units for forming an image using toner of cyan (C), magenta (M), yellow (Y), and black (K). Using these four developing units, the printer unit 127 forms a color image and a monochrome image.

The printer unit 127 includes a laser exposure unit 401, a rotatable polygonal mirror (polygon mirror) 406, a photosensitive drum 402, an image forming unit 403, a fixing unit 404, a flapper 407, and a reversing path 405. The printer unit 127 also includes the sheet feeding cassette 151 and the sheet feeding cassette 152.

The laser exposure unit 401 irradiates the rotatable polygon mirror (polygon mirror) 406 which rotates at a constant angular speed with a light beam, such as a laser beam modulated according to the image data, and directs the light beam to the photosensitive drum 402 as a reflected scanning light.

The image forming unit 403 which corresponds to the image forming unit 130 in FIG. 1 rotates the photosensitive drums 402 to charge them using a charging unit and, then, develops a latent image formed on the photosensitive drums 402 with toner by the laser exposure unit 401. The image forming unit 403 includes four developing units (developing stations). Thus, each of the four developing units performs a sequence of electrophotographic processes in which a toner image is transferred to a sheet and a minute toner which is not transferred and remains on the photosensitive drum 402 is collected. The four developing units which are arranged in the order of cyan (C), magenta (M), yellow, (Y), and black (K) perform image forming in such a manner that the cyan developing unit starts image forming and, after a predetermined time elapses, the magenta, yellow, and black developing units sequentially perform image forming. The timing control allows a color image to be transferred onto a sheet without color misregistration.

The fixing unit 404 is configured by a combination of rollers and belts, and includes a heat source such as a halogen heater. The fixing unit 404 dissolves and fixes the toner on the sheet on which the toner image is transferred by the image forming unit 403 by applying heat and pressure.

The sheet feeding cassettes 151 to 152 and the manual feeding tray 153 each can store sheets. According to the present exemplary embodiment, it is assumed that the sizes of sheets that can be stored in the sheet feeding cassette 151 and the sheet feeding cassette 152 are A5, A4, B5, LTR, and LEGAL.

The MFP 102 feeds a sheet from one of the sheet feeding cassettes 151 to 152 and the manual feeding tray 153, forms an image by the image forming unit 403, and transfers the formed image onto the fed sheet. Then, the MFP 102 fixes the transferred image on the sheet using the fixing unit 404. When the sheet is discharged with the image-formed side downward (face-down discharge), the MFP 102 guides the sheet to the reversing path 405 via the flapper 407 and discharges the reversed sheet to a discharge tray 415. On the other hand, when the sheet is discharged with the image-formed side upward (face-up discharge), the MFP 102 does not guide the sheet to the reversing path 405 via the flapper 407 but discharges the sheet directly to the discharge tray 415.

When an image is printed on both sides of a sheet, the MFP 102 guides the sheet to the reversing path 405 via the flapper 407 and, after pinching the trailing edge of the sheet with a roller 409, guides the sheet to a double-sided conveyance path 408 using a flapper which is not illustrated. The sheet guided to the double-sided conveyance path 408 is conveyed again to the image forming unit 403, and an image is printed on the back side of the sheet by the image forming unit 403. The sheet on which the image is printed on its back side is discharged to the discharge tray 415.

As described above, the MFP 102 performs print processing for printing an image on a sheet.

The MFP 102 according to the present exemplary embodiment includes sensors S1 to S13 for detecting a sheet to be conveyed. These sensors S1 to S13 are provided on the sheet conveyance path. The CPU 120 recognizes a position of a conveyed sheet according to a signal from the sensors S1 to S13.

The CPU 120 also detects a sheet jam according to a signal from the sensors S1 to S13. More specifically, the CPU 120 determines that a sheet jam has occurred when a predetermined time elapses between the time a sheet passes a sensor and the time the sheet is expected to pass a next sensor. In this case, the CPU 120 determines that a sheet jam has occurred at a point between the sensor that the sheet has passed and the sensor that the sheet is to pass next. Alternatively, in a case where a sensor keeps detecting a sheet for a time longer than a time usually required for a sheet of a particular size to pass the sensor, the CPU 120 determines that a jam has occurred. Then, the CPU 120 displays a screen on the operation unit 125 to allow the user to identify the position where the jam occurred.

As described above with reference to FIG. 1, a device including the sheet feeding cassette 154 and the sheet feeding cassette 155 may be added to the MFP 102 as an optional device.

Figure 3:
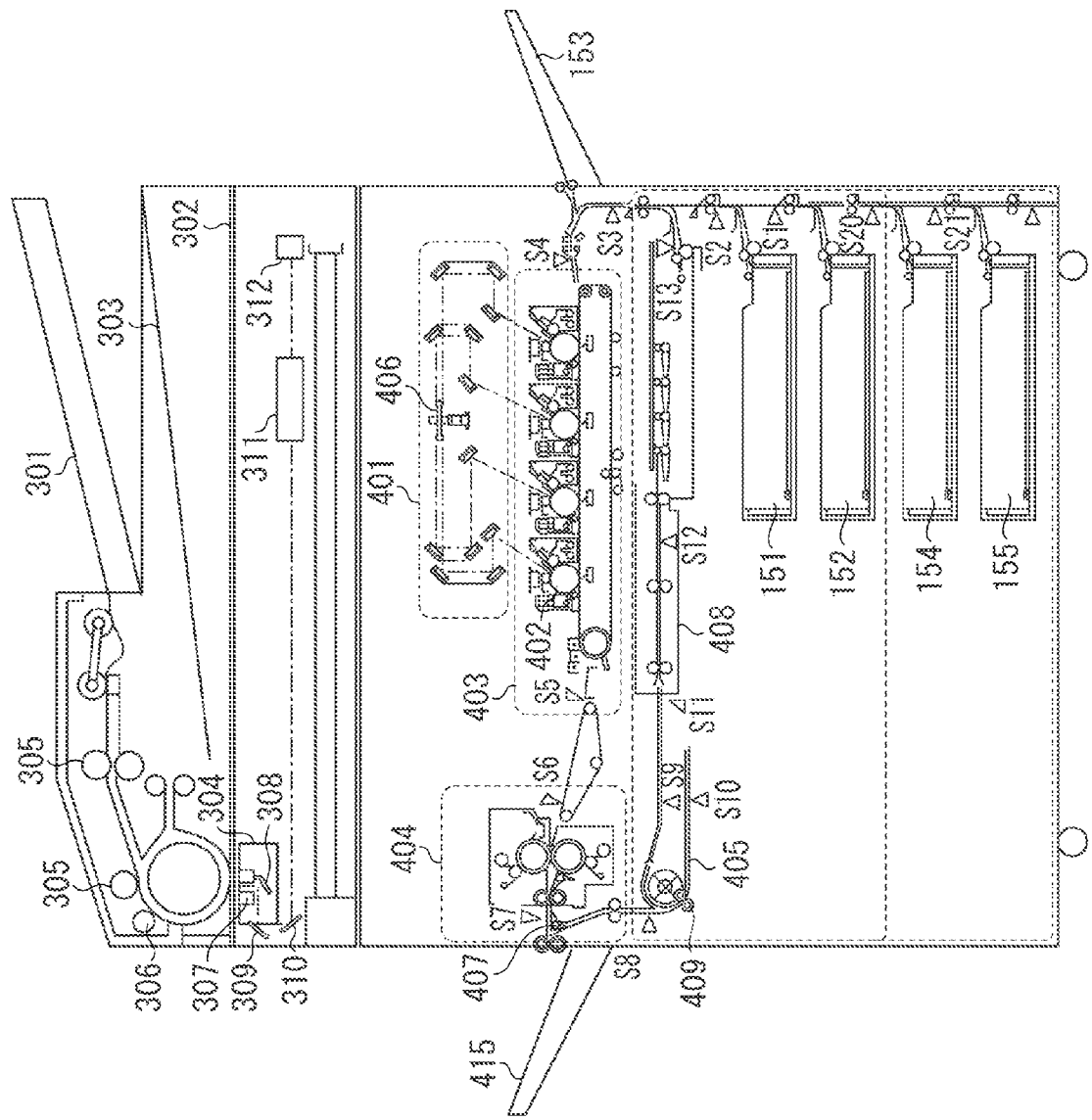
FIG. 3 illustrates a printing apparatus according to the exemplary embodiment.

FIG. 3 illustrates the structure of the MFP 102 after the optional device is added.

As with the sheet feeding cassettes 151 to 152, the added sheet feeding cassettes 154 to 155 can store sheets, respectively. According to the present exemplary embodiment, it is assumed that the sizes of sheets that can be stored in the sheet feeding cassette 154 and the sheet feeding cassette 155 are A5, A4, B5, LTR, and LEGAL.

When the optional device is added, the MFP 102 feeds a sheet from one of the sheet feeding cassettes 151 and 152, the manual feeding tray 153, and the sheet feeding cassettes 154 and 155. The MFP 102 forms an image using the image forming unit 403 and transfers the image formed by the image forming unit 403 to the fed sheet. As described above, the sheet feeding cassettes 154 to 155 are provided as an optional device, so that the cost of the MFP 102 without the optional device can be reduced. In addition, the user can purchase an optional device as necessary to increase the number of sheet feeding cassettes for improving the convenience.

Figure 4:
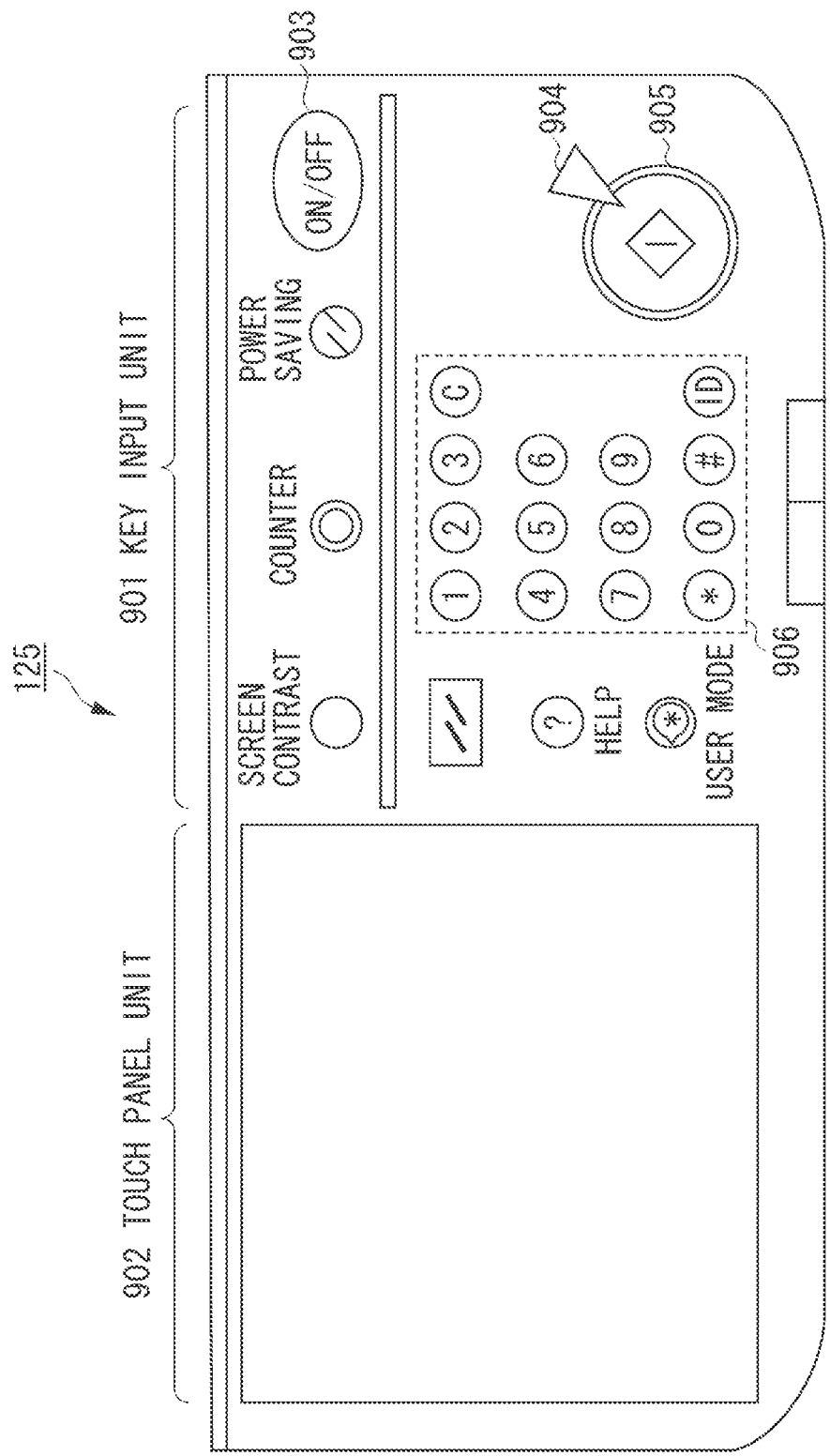
FIG. 4 illustrates an operation unit of the printing apparatus according to the exemplary embodiment.

Next, with reference to FIG. 4, the operation unit 125 of the MFP 102 illustrated in FIG. 1 is described.

The operation unit 125 includes a key input unit 901 and a touch panel unit 902. The key input unit 901 receives a user operation via hard keys. The touch panel unit 902 can display soft keys (display keys) for receiving a user operation via the soft keys.

First, the key input unit 901 is described. As illustrated in FIG. 4, the key input unit 901 includes an operation unit power switch 903. If the user presses the operation unit power switch 903 while the MFP 102 is in a standby mode (a normal operation state), the CPU 120 switches the MFP 102 from the standby mode to a sleep mode (i.e., a power saving state). On the other hand, if the user presses the operation unit power switch 903 while the MFP 102 is in the sleep mode, the CPU 120 switches the MFP 102 from the sleep mode to the standby mode.

A start key 905 is a key to receive an instruction from the user to cause the MFP 102 to execute a copy job or a data transmission job.

A stop key 904 is a key to receive an instruction from the user to stop a copy job or a data transmission job.

A numeric keypad 906 includes keys, such as numeric keys, that are used by the user to specify values for various settings.

Next, the touch panel unit 902 is described. The touch panel unit 902 includes a liquid crystal display (LCD) and a touch panel sheet configured by a transparent electrode pasted on the LCD. The touch panel unit 902 has a function of receiving various settings from the user and a function of presenting information to the user.

Figure 5:
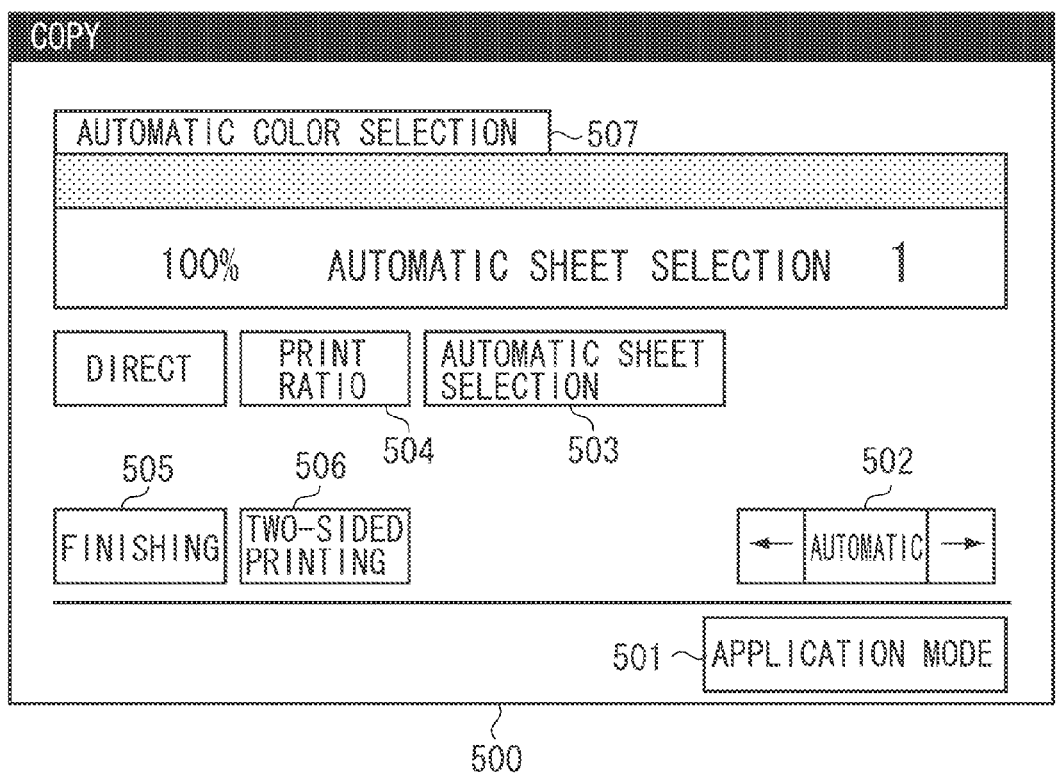
FIG. 5 illustrates an operation screen of the printing apparatus according to the exemplary embodiment.

An initial screen 500 illustrated in FIG. 5 is displayed on the touch panel unit 902.

The initial screen 500 includes an application mode key 501, a density adjustment key 502, a sheet selection key 503, a print ratio setting key 504, a finishing key 505, a two-sided printing setting key 506, and a color mode setting key 507. The user can press these keys to specify the setting of a job.

The application mode key 501 is a key used to set a reduction layout function and a preview function. The reduction layout function is used to arrange images of a plurality of read documents on one sheet to print. The preview function is used to display an image of a read document on the touch panel unit 902 before printing.

The density adjustment key 502 is a key used to adjust the printing density.

Figure 7A:
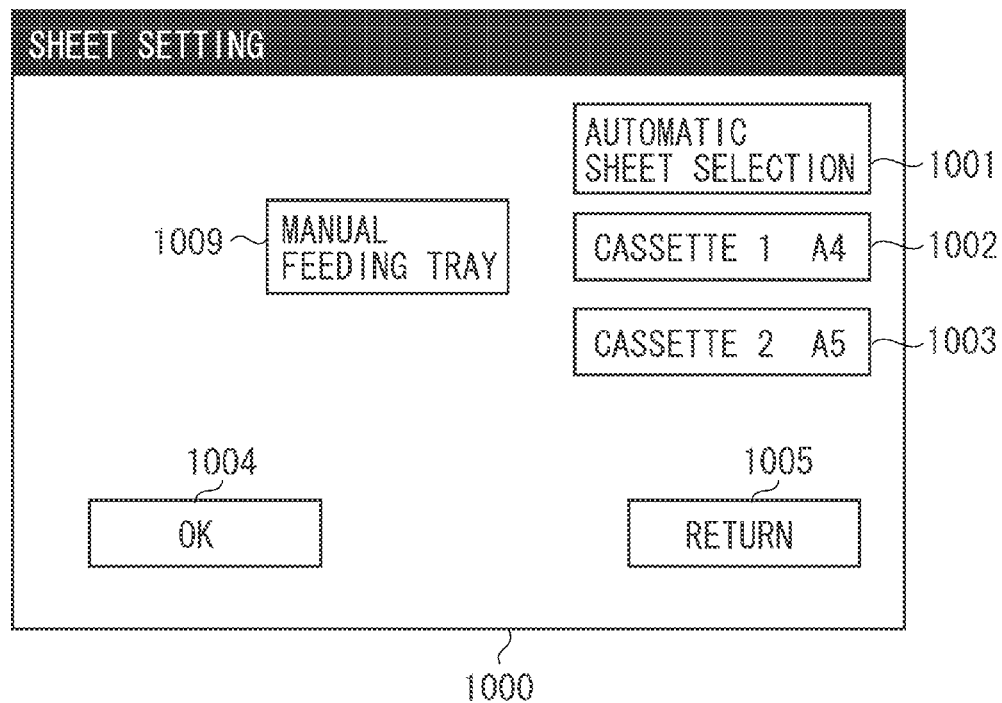
FIGS. 7A and 7B illustrate operation screens of the printing apparatus according to the exemplary embodiment.
Figure 7B:
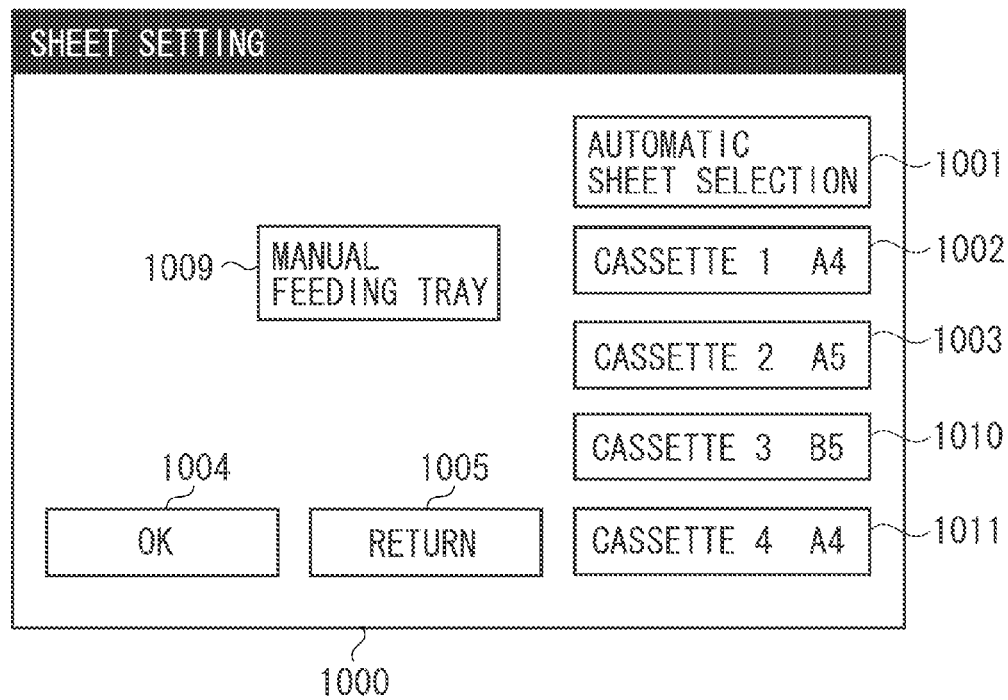

The sheet selection key 503 is a key used to display a sheet selection screen 1000 illustrated in FIGS. 7A and 7B. The sheet selection screen 1000 is a screen used to receive a setting for determining the sheet feeding cassette from which a print sheet is supplied (conveyance source) from the user.

The print ratio setting key 504 is a key used to set a print ratio. The finishing key 505 is a key used to set post-processing. For example, using a screen to be displayed when the finishing key 505 is pressed, the user can set a shift sort function of shifting the sheets on which an image is printed in units of copies and discharging. The two-sided printing setting key 506 is a key used to set two-sided printing.

The color mode setting key 507 is a key used to determine the method for determining the color of an image in a document. When the color mode is selected by the color mode setting key 507, the CPU 120 recognizes all images in a read document as color images. In addition, when the monochromatic mode is selected by the color mode setting key 507, the CPU 120 recognizes all images in a read document as monochrome images. When the automatic color selection is selected, the CPU 120 determines whether color pixels are included in the image of a read document. If color pixels are included, the CPU 120 recognizes that the image in the document is a color image. If color pixels are not included, the CPU 120 recognizes that the image in the document is a monochrome image.

After the print settings are received via the screen described above, the CPU 120 of the MFP 102 performs the copy operation when the start key 905 is pressed.

The sheet feeding cassettes 151 and 152 of the MFP 102 according to the present exemplary embodiment do not include a mechanism for detecting the size of a sheet (a sheet guide, a sensor for detecting a position of the sheet guide, or the like).

Instead, the MFP 102 receives the size of sheets which are stored in the sheet feeding cassettes 151 and 152 from the user as the settings of the apparatus. The CPU 120 receives these settings from the user via screens illustrated in FIGS. 6A and 6B.

Figure 6A:
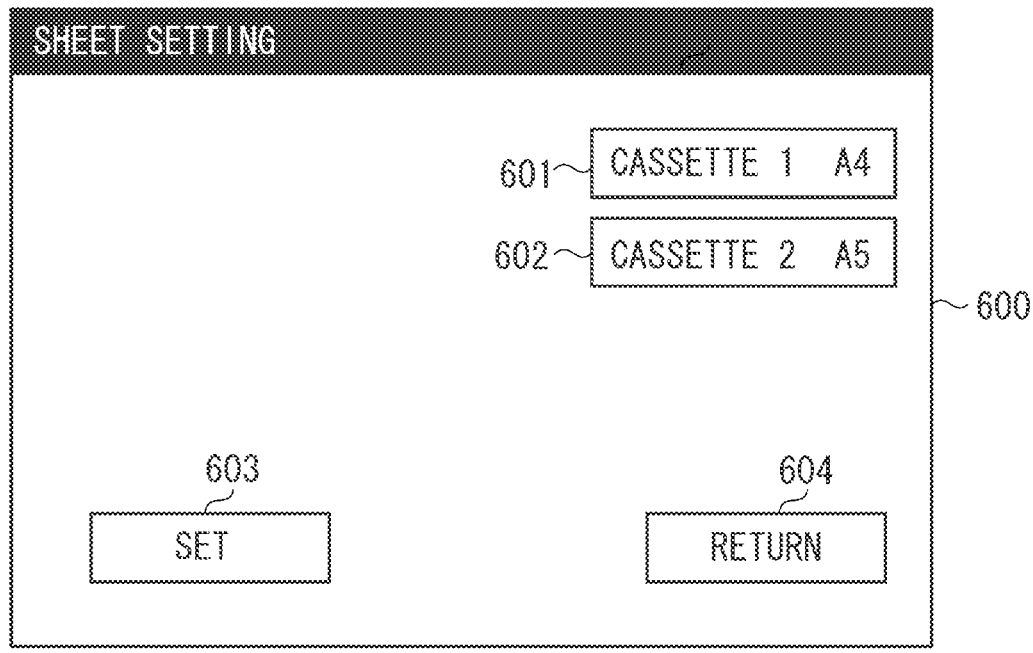
FIGS. 6A and 6B illustrate operation screens of the printing apparatus according to the exemplary embodiment.
Figure 6B:
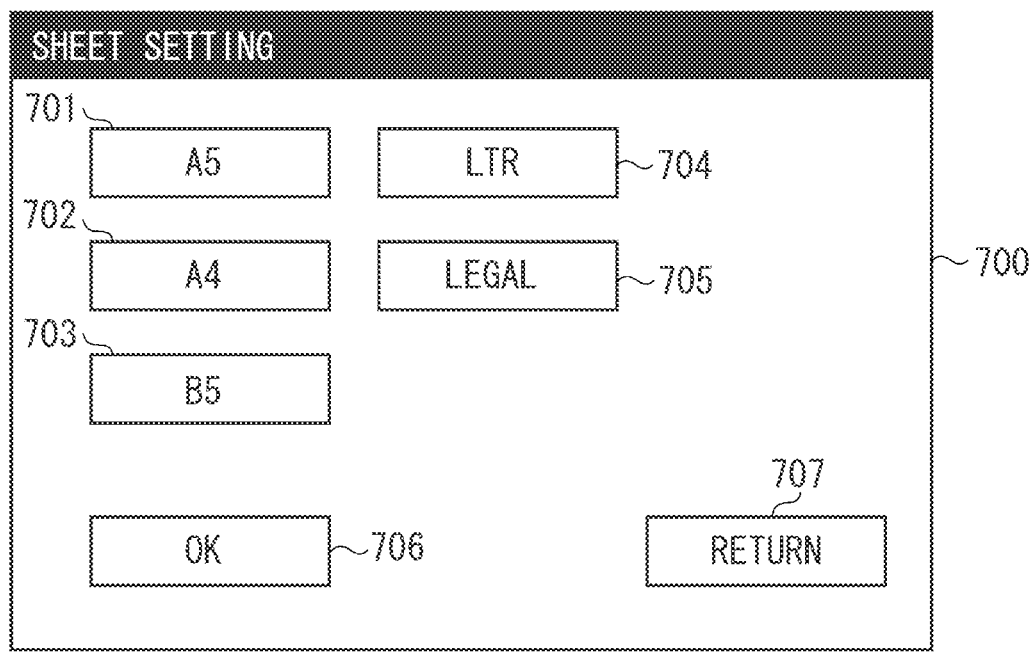

A screen 600 in FIG. 6A is a screen via which the user selects the sheet feeding cassette to which the user wants to set a sheet size. The screen illustrated in FIG. 6A is displayed when a user mode key on the operation unit 125 illustrated in FIG. 4 is pressed.

A key 601 in FIG. 6A corresponds to the sheet feeding cassette 151. The CPU 120 refers to tables in FIGS. 8A and 8B and displays the sheet size A4 which is set for the sheet feeding cassette 151 on the key 601.

A key 602 corresponds to the sheet feeding cassette 152. The CPU 120 refers to the tables in FIGS. 8A and 8B and displays the sheet size A5 which is set for the sheet feeding cassette 152 on the key 602.

A return key 604 is a key used to close the screen 600 without reflecting the setting specified on the screen 600. When the screen 600 is closed, the screen 500 is displayed.

The user can press the key 601 or the key 602 that corresponds to the sheet feeding cassette to which the user wants to set the sheet size. When the key 601 or the key 602 is pressed, the CPU 120 places the pressed key in a selection state. Then, when a set key 603 is pressed, the CPU 120 displays a screen 700 illustrated in FIG. 6B on the touch panel unit 902. The screen 700 is a screen for setting a sheet size to the sheet feeding cassette corresponding to the key that is in the selection state when the set key 603 is pressed on the screen 600.

Keys 701 to 705 are displayed on the screen 700. These keys are used to set the sheet sizes A5, A4, B5, LTR, and LEGAL, respectively. When the user presses one of the keys 701 to 705 corresponding to the size that the user wants to set, the CPU 120 places the pressed key in the selection state. When an OK key 706 is pressed with one of the keys 701 to 705 pressed, the CPU 120 sets the sheet size corresponding to the key pressed on the screen 700 to the sheet feeding cassette placed in the selection state on the screen 600. The CPU 120 updates the table illustrated in FIG. 8A and, at the same time, displays the newly set sheet size on the screen in FIG. 6A.

A return key 707 is a key used to close the screen 700 without reflecting the settings specified on the screen 700. When the screen 700 is closed, the screen 600 is displayed.

The CPU 120 stores the received size information about the sheet feeding cassettes 151 and 152 in the nonvolatile memory unit 124 as the storage unit information as illustrated in FIGS. 8A and 8B.

The storage unit information is described below with reference to FIGS. 8A and 8B.

FIG. 8A illustrates the storage unit information before the optional device is added.

"Number of storage units" in FIG. 8A indicates the number of sheet storage units provided in the MFP 102. The number of sheet storage units includes not only sheet feeding cassettes but also manual feeding trays. "Number of storage units" in FIG. 8A is set to "3".

"Storage unit ID" indicates the identifier used to identify each sheet storage unit. The storage ID of "1" is assigned to the sheet feeding cassette 151, and the storage ID of "2" to the sheet feeding cassette 152. The storage ID of "3" is assigned to the manual feeding tray 153. "Storage unit ID" of each originally equipped sheet feeding cassette is set in advance in the tables in FIGS. 8A and 8B at the time of shipment of the MFP 102 from the factory. The storage unit IDs are assigned in the ascending order, from the sheet feeding cassette nearest to the image forming unit. For the manual feeding tray, a storage unit ID larger than those of the sheet feeding cassettes is assigned exceptionally.

"Sheet size" indicates the size of a sheet stored in each sheet storage unit. The value of "0" indicates that the sheet size is not set by the user.

"Remaining sheet amount" indicates a remaining amount of sheets stored in each sheet storage unit. The remaining sheet amount is represented as the percentage (%) of sheets stored in the sheet storage unit where 100% means that the maximum number of sheets is stored. "Remaining sheet amount" is set by the CPU 120 according to information from a remaining sheet amount detection sensor provided to the sheet feeding cassette.

"Size detection ability" indicates whether each sheet storage unit has an ability to detect the size of stored sheets. The value of "0" indicates that the sheet storage unit does not have the ability to detect the size of stored sheets. The value of "1" indicates that the sheet storage unit has the ability to detect the size of stored sheets. "Size detection ability" of each originally equipped sheet feeding cassette is set in advance in the tables in FIGS. 8A and 8B at the time of shipment of the MFP 102 from the factory.

"Storage unit type" indicates the type of the sheet storage unit, either a sheet feeding cassette or a manual feeding tray. The value of "0" indicates a sheet feeding cassette, and "1" indicates a manual feeding tray. "Storage unit type" of each originally equipped sheet feeding cassette is set in advance in the tables in FIGS. 8A and 8B at the time of shipment of the MFP 102 from the factory.

FIG. 8B illustrates storage unit information after the optional device is added. When the optional device is added, the CPU 120 recognizes, via the sensor 128, that the optional device is added. Then, the CPU 120 receives information about a configuration of the optional device from a memory (not illustrated) provided to the optional device. The information includes storage unit information about the optional device. Based on the information, the CPU 120 rewrites the storage unit information illustrated in FIG. 8A. When the optional device that includes the sheet feeding cassette 154 and the sheet feeding cassette 155 as illustrated in FIG. 3 is connected, the storage unit information illustrated in FIG. 8A is updated to the storage unit information illustrated in FIG. 8B.

The storage unit ID "4" is assigned to the sheet feeding cassette 154, and the storage unit ID "5" to the sheet feeding cassette 155. These information pieces are assigned by the CPU 120. The CPU 120 generates the storage ID values by incrementing the largest value of the storage ID assigned to the originally equipped sheet storage units, and assigns the generated values to the sheet feeding cassette 154 and the sheet feeding cassette 155.

The sheet feeding cassette 154 and the sheet feeding cassette 155 each have a size detection sensor for detecting the size of stored sheets and, therefore, the value of "1" is assigned as "size detection ability". The "size detection ability" of the optional device is stored in the memory of the optional device as the storage unit information. Based on the storage unit information received from the memory of the optional device, the CPU 120 inputs the values of "size detection ability".

The CPU 120 receives signals from the respective size detection sensors of the sheet feeding cassette 154 and the sheet feeding cassette 155 and inputs the value corresponding to the received signal in "sheet size". In addition, based on the information received from the respective remaining amount detection sensors of the sheet feeding cassette 154 and the sheet feeding cassette 155, the CPU 120 inputs the value in "remaining sheet amount".

Similar to the information about "size detection ability", the information about "storage unit type" is stored in the memory of the optional device as the storage unit information. The CPU 120 inputs values in "storage unit type" based on the storage unit information received from the memory of the optional device. Because neither the sheet feeding cassette 154 nor the sheet feeding cassette 155 is a manual feeding tray, the value of "0" is entered.

As described above, the CPU 120 grasps the configuration of the sheet storage units in the MFP 102 and manages the information about the sheet storage units in the memory unit 124 as the storage unit information.

Based on the storage unit information, the selection screens illustrated in FIGS. 7A and 7B are displayed on the operation unit 125. FIG. 7A illustrates an example of the selection screen before the optional device is connected. FIG. 7B illustrates an example of the selection screen after the optional device is connected.

An automatic sheet selection key 1001, illustrated in FIG. 7A, is a key that enables an automatic sheet selection function for selecting a sheet feeding cassette to be used by the CPU 120 for printing according to the size of an image on a document.

Sheet feeding cassette selection keys 1002 to 1003, illustrated in FIG. 7A, are keys that do not cause the MFP 102 to select a sheet feeding cassette to be used for printing but allows the user to directly specify a sheet feeding cassette. A cassette 1 of the key 1002 on the screen illustrated in FIG. 7A corresponds to the sheet feeding cassette 151. A cassette 2 of the key 1003 on the screen corresponds to the sheet feeding cassette 152. A manual feeding tray 1009 corresponds to the manual feeding tray 153.

Next, the selection screen to be displayed after the optional device is connected is described with reference to FIG. 7B.

The automatic sheet selection key 1001, illustrated in FIG. 7B, is a key that enables the automatic sheet selection function for selecting a sheet feeding cassette to be used by the CPU 120 for printing according to the size of an image on a document.

The sheet feeding cassette selection keys 1002 to 1003 and 1010 to 1011, illustrated in FIG. 7B, are keys that do not cause the MFP 102 to select a sheet feeding cassette to be used for printing but allows the user to directly specify a sheet feeding cassette. The cassette 1 of the key 1002 on the screen illustrated in FIG. 7B corresponds to the sheet feeding cassette 151. The cassette 2 of the key 1003 on the screen corresponds to the sheet feeding cassette 152. A cassette 3 of the key 1010 on the screen corresponds to the sheet feeding cassette 154. A cassette 4 of the key 1011 on the screen corresponds to the sheet feeding cassette 155. In addition, the manual feeding tray 1009 corresponds to the manual feeding tray 153.

Based on the setting contents set via the screen illustrated in FIG. 7A or FIG. 7B, the CPU 120 determines a sheet storage unit to be used for printing.

In this case, since a sheet size set for the sheet feeding cassette 151 or 152 is received from the user, the user may specify an incorrect size. Therefore, the size set by the user may differ from the size of a sheet that is actually set in the sheet feeding cassette 151 or 152. If the size set by the user differs from the size of a sheet that is actually set in the sheet feeding cassette 151 or 152, the MFP 102 cannot feed a sheet of a size intended by the user.

For example, it is assumed that A4 is set as the size information (attribute information) about the sheet feeding cassette 151 when A5 size sheets are stored in the sheet feeding cassette 151. In this case, when a job specifying that an image is printed on an A4 sheet is executed, the MFP 102 feeds a sheet from the sheet feeding cassette 151 to print an image with a size suitable for an A4 size sheet. However, because an A5 size sheet is actually fed, an image defect occurs in which an image is printed beyond the edge of the sheet.

As another example, it is assumed that A5 is set as the size information about the sheet feeding cassette 151 when A4 size sheets are stored in the sheet feeding cassette 151. In this case, when a job specifying that an image is printed on an A5 sheet is executed, the MFP 102 feeds a sheet from the sheet feeding cassette 151 and prints a reduced image according to the A5 size sheet. However, because an A4 size sheet is actually fed, the image is smaller in relation to the sheet and an unintended print result is produced.

On the other hand, the sheet storage units capable of detecting the size of stored sheets, such as the sheet feeding cassettes 154 and 155, can grasp information about the size of actually stored sheets. Therefore, these sheet storage units can prevent an image defect.

Conventionally, when same size sheets are stored in a plurality of sheet storage units, the MFP 102 conveys sheets preferentially from a sheet storage unit of which conveyance distance to the image forming unit 403 is shorter (not including the manual feeding tray). Accordingly, the MFP 102 shortens the time required to complete printing.

However, when a sheet feeding cassette added as the optional device has the size detection ability, the MFP 102 conveys sheets preferentially from the sheet feeding cassette having the size detection ability. Accordingly, sheets can be conveyed preferentially from a sheet storage unit that is less likely to cause an image defect. Further, when there is a plurality of sheet storage units each having the size detection ability, the MFP 102 conveys sheets preferentially from one of the plurality of sheet storage units of which conveyance distance to the image forming unit 403 is shorter.

If sheets of a size required for printing are not stored in any of the sheet feeding cassettes, the CPU 120 performs control to convey sheets from the manual feeding tray 153.

Figure 9:
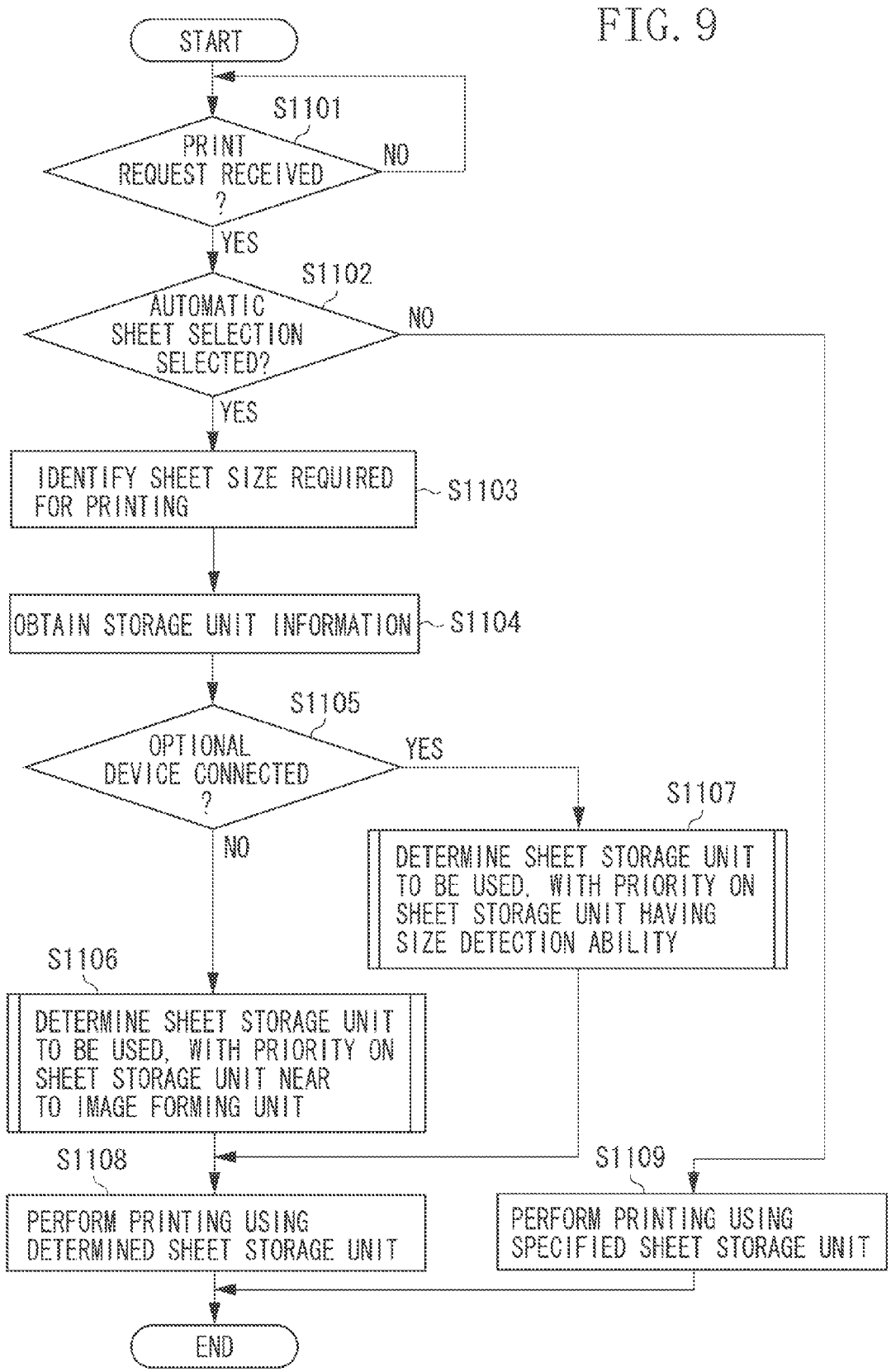
FIG. 9 is a flowchart illustrating an example of processing according to the exemplary embodiment.

Referring to a flowchart in FIG. 9, the automatic selection processing is described. In the automatic selection processing, the CPU 120 searches for a sheet storage unit in which sheets required for printing are stored, and selects the sheet storage unit that is found as the result of the search. The CPU 120 reads a program stored in the ROM 121 and executes it to perform the processing illustrated in the flowchart in FIG. 9.

In step S1101, the CPU 120 determines whether a print request is received. If a print request is received (YES in step S1101), the CPU 120 advances the processing to step S1102. The print request is issued when a copy job execution instruction, a print job execution instruction, or a facsimile job execution instruction is received.

In step S1102, the CPU 120 determines whether the automatic sheet selection is selected. In a case of a copy job, the CPU 120 determines that the automatic sheet selection is selected if "automatic sheet selection" is selected on the screen illustrated in FIG. 7A or 7B. On the other hand, in a case where a specific sheet feeding cassette is specified, the CPU 120 determines that the automatic sheet selection is not selected. If the automatic sheet selection is selected (YES in step S1102), the CPU 120 advances the processing to step S1103. If the automatic sheet selection is not selected (NO in step S1102), the CPU 120 advances the processing to step S1109.

In a case of a print job, the CPU 120 displays a screen similar to the one illustrated in FIG. 7A or FIG. 7B on the display unit 109 of the PC 101 to prompt the user to select "automatic sheet selection" or a specific sheet feeding cassette. Then, information indicating which is selected by the user is transmitted together with image data from the PC 101 to the MFP 102. The CPU 120 of the MFP 102 receives the information to make the determination in step S1102.

In a case of a facsimile job, the user cannot select to use "automatic sheet selection" or to use a specific sheet feeding cassette on the transmission side device. Therefore, the CPU 120 skips the processing in step S1102 and advances the processing to step S1103.

When the processing proceeds to step S1109, the CPU 120 feeds a sheet from the sheet storage unit specified by the user and prints an image on the fed sheet.

On the other hand, if the processing proceeds to step S1103, the CPU 120 identifies the size of a sheet required for printing.

In a case of a copy job, the CPU 120 identifies the size of a sheet required for printing based on the size of an image in a document and the print ratio specified by the user via the operation unit 125.

In a case of a print job, the CPU 120 identifies the size of a sheet required for printing based on the size of image data generated by the PC 101 and the print ratio specified by the printer driver of the PC 101.

In a case of a facsimile job, the CPU 120 determines the size of a sheet required for printing based on the size of a received image.

In step S1104, the CPU 120 obtains storage unit information stored in the memory unit 124.

In step S1105, the CPU 120 determines whether the optional device is connected. More specifically, the CPU 120 refers to the "number of storage units" included in the storage unit information and determines whether the "number of storage units" is two (or larger than two). If the "number of storage units" is not two (larger than two), the CPU 120 determines that the optional device is connected. On the other hand, if the "number of storage units" is two, the CPU 120 determines that the optional device is not connected. The CPU 120 can make such a determination because the number of storage units is two if the optional device is not connected.

If the optional device is not connected (NO in step S1105), the CPU 120 advances the processing to step S1106. If the optional device is connected (YES in step S1105), the CPU 120 advances the processing to step S1107.

In step S1106, the CPU 120 selects the sheet storage unit to be used, with priority on the sheet storage unit nearer to the image forming unit over the sheet storage unit having the size detection ability. The detail of the processing in step S1106 is described with reference to FIG. 10.

In step S1107, the CPU 120 selects the sheet storage unit to be used, with priority on the sheet storage unit having the size detection ability over the sheet storage unit nearer to the image forming unit. The detail of the processing in step S1107 is described with reference to FIG. 11.

In step S1108, the CPU 120 feeds a sheet from the sheet storage unit determined in step S1106 or S1107 and prints an image on the fed sheet.

Next, the processing (i.e., first search processing) in step S1106 in FIG. 9 is described with reference to a flowchart in FIG. 10. The CPU 120 reads a program stored in the ROM 121 and executes it to perform the processing illustrated in the flowchart in FIG. 10.

Figure 10:
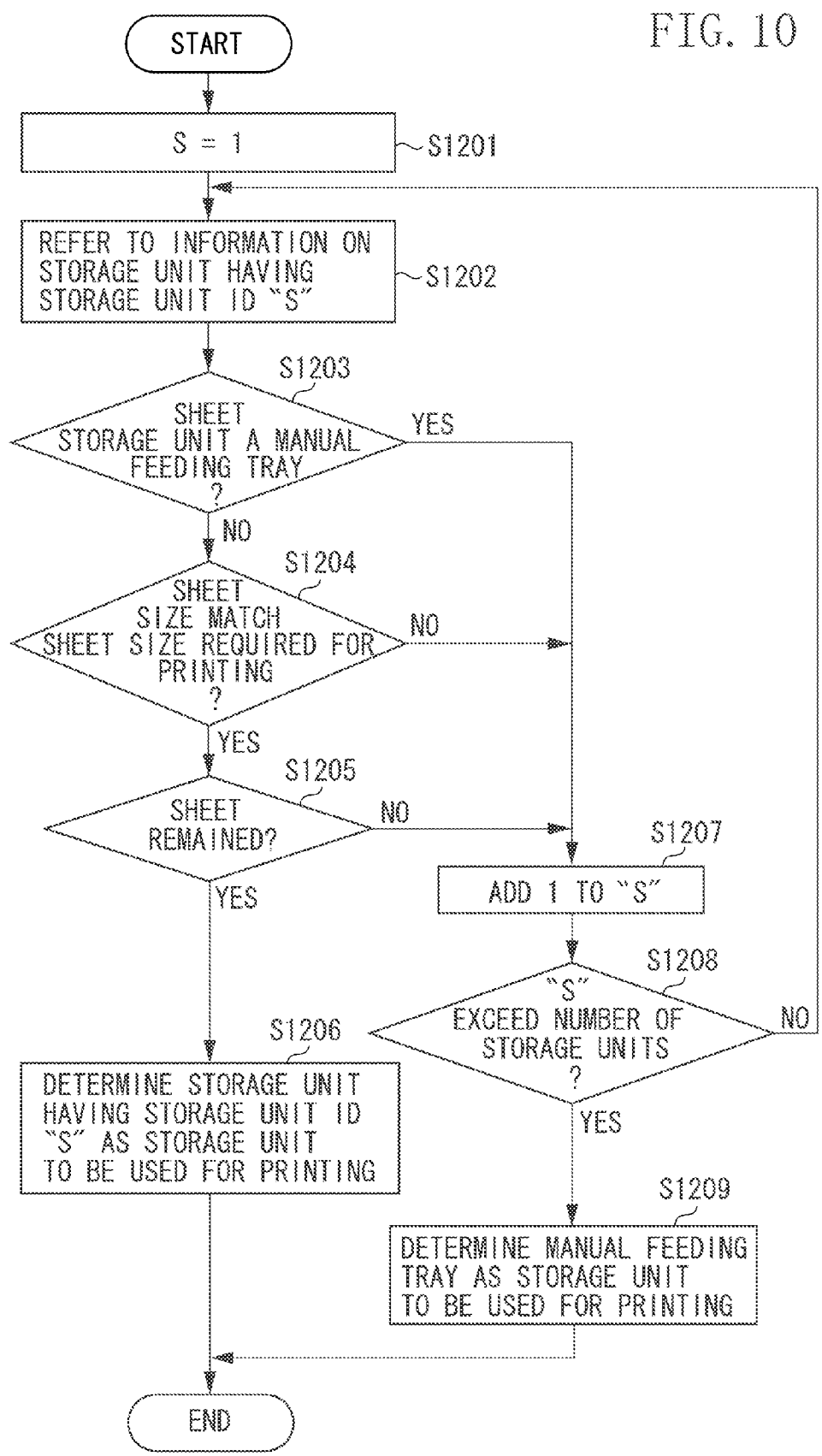
FIG. 10 is a flowchart illustrating an example of processing according to the exemplary embodiment.

FIG. 10 illustrates the processing for selecting a sheet storage unit to be used with priority on a sheet storage unit nearer to the image forming device. Low priority is assigned to the manual feeding tray because it is selected only when sheets of a size required for printing are not set in any of the sheet feeding cassettes.

In step S1201, the CPU 120 creates a variable S in the RAM 122 and assigns 1 to the variable S.

In step S1202, the CPU 120 refers to the storage unit information including the storage unit ID of the variable S.

In step S1203, the CPU 120 determines whether the sheet storage unit with the storage unit ID of the variable S is the manual feeding tray. If the sheet storage unit is the manual feeding tray (YES in step S1203), the CPU 120 advances the processing to step S1207 and adds 1 to the variable S since the manual feeding tray should be selected last.

If the sheet storage unit is not the manual feeding tray (NO in step S1203), the CPU 120 advances the processing to step S1204.

In step S1204, the CPU 120 determines whether the size of a sheet stored in the sheet storage unit with the storage unit ID of the variable S matches the size required for printing of the job. If the sizes do not match (NO in step S1204), the CPU 120 advances the processing to step S1207 and adds 1 to the variable S. On the other hand, if the sizes match (YES in step S1204), the CPU 120 advances the processing to step S1205.

In step S1205, the CPU 120 determines whether there is a remaining sheet amount in the storage unit with the storage unit ID of the variable S. If there is a remaining sheet amount (YES in step S1205), the processing proceeds to step S1206. If there is no remaining sheet amount (NO in step S1205), the processing proceeds to step S1207.

In step S1206, the CPU 120 determines the storage unit with the storage unit ID of the variable S as the storage unit to be used for printing. Then, the CPU 120 advances the processing to step S1108 in FIG. 9.

In step S1207, the CPU 120 adds 1 to the variable S and, in step S1208, determines whether the variable S exceeds the number of storage units. Since the number of storage units is included in the storage unit information, the CPU 120 refers to the number of storage units included in that information to make the determination.

If the variable S does not exceed the number of storage units (NO in step S1208), the CPU 120 returns the processing to step S1202. On the other hand, if the variable S exceeds the number of storage units (YES in step S1208), the CPU 120 advances the processing to step S1209. This means that sheets of a size required for printing are not set in any of the sheet feeding cassettes provided in the MFP 102.

In step S1209, the CPU 120 determines the manual feeding tray as the storage unit to be used for printing.

Then, the CPU 120 advances the processing to step S1108 in FIG. 9.

Figure 11:
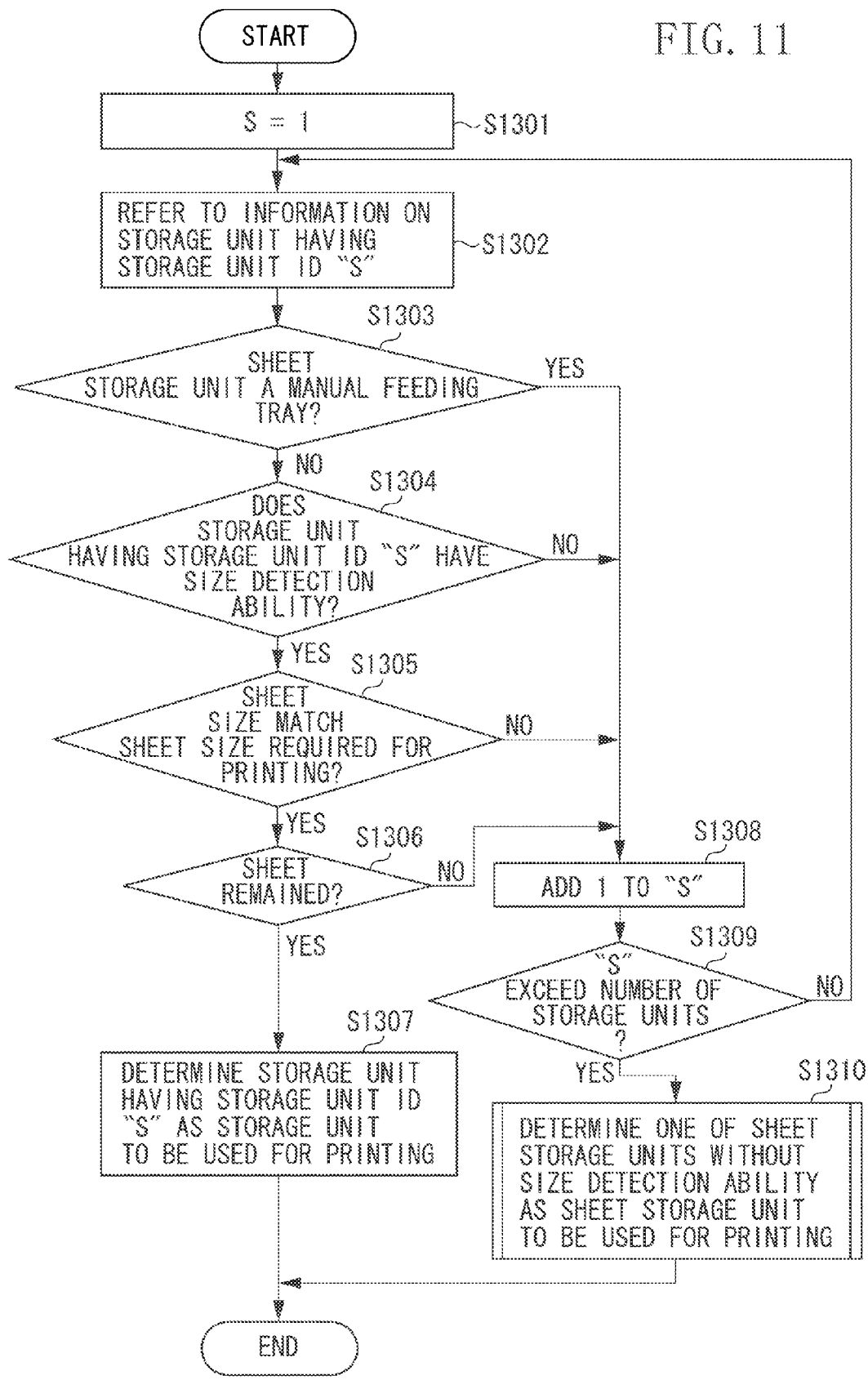
FIG. 11 is a flowchart illustrating an example of processing according to the exemplary embodiment.

Next, referring to a flowchart in FIG. 11, the processing (i.e., second search processing) in step S1107 in FIG. 9 is described. The CPU 120 reads a program stored in the ROM 121 and executes it to perform the processing illustrated in the flowchart in FIG. 11.

In step S1301, the CPU 120 creates the variable S in the RAM 122 and assigns 1 to the variable S.

In step S1302, the CPU 120 refers to the storage unit information including the storage unit ID of the variable S.

In step S1303, the CPU 120 determines whether the sheet storage unit with the storage unit ID of the variable S is the manual feeding tray. If the sheet storage unit is the manual feeding tray (YES in step S1303), the CPU 120 advances the processing to step S1308 and adds 1 to the variable S since the manual feeding tray should be selected last.

In step S1304, the CPU 120 refers to the "size detection ability" in the storage unit information to determine whether the storage unit with the storage unit ID of the variable S has the size detection ability. If the storage unit has the size detection ability (YES in step S1304), the CPU 120 advances the processing to step S1305. If the storage unit does not have the size detection ability (NO in step S1304), the CPU 120 advances the processing to step S1308. The branch processing in step S1304 is performed to allow the sheet storage unit having the size detection ability to be selected preferentially as a candidate for the sheet storage unit to be used for printing.

In step S1305, the CPU 120 determines whether the size of a sheet stored in the sheet storage unit with the storage unit ID of the variable S matches the size required for printing of the job. If the sizes do not match (NO in step S1305), the CPU 120 advances the processing to step S1308 and adds 1 to the variable S. On the other hand, if the sizes match (YES in step S1305), the CPU 120 advances the processing to step S1306.

In step S1306, the CPU 120 determines whether there is a remaining sheet amount in the storage unit with the storage unit ID of the variable S. If there is a remaining sheet amount (YES in step S1306), the CPU 120 advances the processing to step S1307. On the other hand, if there is no remaining sheet amount (NO in step S1306), the CPU 120 advances the processing to step S1308 and adds 1 to the variable S.

In step S1307, the CPU 120 determines the storage unit with the storage unit ID of the variable S as the storage unit to be used for printing. Then, the CPU 120 advances the processing to step S1108 in FIG. 9.

In step S1308, the CPU 120 adds 1 to the variable S. Then, in step S1309, the CPU 120 determines whether the variable S exceeds the number of storage units. Since the number of storage units is included in the storage unit information, the CPU 120 refers to the number of storage units included in that information to make the determination.

If the variable S does not exceed the number of storage units (NO in step S1309), the CPU 120 returns the processing to step S1302. On the other hand, if the variable S exceeds the number of storage units (YES in step S1309), the CPU 120 advances the processing to step S1310. This means that sheets of a size required for printing are not set in any of the sheet feeding cassettes which have the size detection ability and are provided in the MFP 102.

In step S1310, the CPU 120 performs processing for determining the sheet storage unit to be used for printing from among the sheet storage units which do not have the size detection ability. The detail of the processing in step S1310 is described with reference to FIG. 12.

After completion of the processing in step S1310, the CPU 120 advances the processing to step S1108 in FIG. 9.

Next, referring to a flowchart in FIG. 12, the processing in step S1310 in FIG. 11 is described. The CPU 120 reads a program stored in the ROM 121 and executes it to perform the processing illustrated in the flowchart in FIG. 12.

In step S1401, the CPU 120 creates the variable S in the RAM 122 and assigns 1 to the variable S.

In step S1402, the CPU 120 refers to the storage unit information including the storage unit ID of the variable S.

In step S1403, the CPU 120 determines whether the sheet storage unit with the storage unit ID of the variable S is the manual feeding tray. If the sheet storage unit is the manual feeding tray (YES in step S1403), the CPU 120 advances the processing to step S1408 and adds 1 to the variable S since the manual feeding tray should be selected last.

In step S1404, the CPU 120 refers to the "size detection ability" in the storage unit information to determine whether the storage unit with the storage unit ID of the variable S has the size detection ability. If the storage unit does not have the size detection ability (NO in step S1404), the CPU 120 advances the processing to step S1405. If the storage unit has the size detection ability (YES in step S1404), the CPU 120 advances the processing to step S1408. The CPU 120 performs this processing to prevent the determination from being made again for the sheet storage unit having the size detection ability, because it is already determined in the processing in the flowchart illustrated in FIG. 11 that the sheet storage unit having the size detection ability does not become a candidate for the sheet storage unit to be used for printing.

In step S1405, the CPU 120 determines whether the size of a sheet stored in the sheet storage unit with the storage unit ID of the variable S matches the size required for printing of the job. If the sizes do not match (NO in step S1405), the CPU 120 advances the processing to step S1408 and adds 1 to the variable S. On the other hand, if the sizes match (YES in step S1405), the CPU 120 advances the processing to step S1406.

In step S1406, the CPU 120 determines whether there is a remaining sheet amount in the storage unit with the storage unit ID of the variable S. If there is a remaining sheet amount (YES in step S1406), the CPU 120 advances the processing to step S1407. On the other hand, if there is no remaining sheet amount (NO in step S1406), the CPU 120 advances the processing to step S1408 and adds 1 to the variable S.

In step S1407, the CPU 120 determines the storage unit with the storage unit ID of the variable S as the storage unit to be used for printing. Then, the CPU 120 advances the processing to step S1108 in FIG. 9.

In step S1408, the CPU 120 adds 1 to the variable S. Then, in step S1409, the CPU 120 determines whether the variable S exceeds the number of storage units. Since the number of storage units is included in the storage unit information, the CPU 120 refers to the number of storage units included in that information to make the determination.

If the variable S does not exceed the number of storage units (NO in step S1409), the CPU 120 returns the processing to step S1402. On the other hand, if the variable S exceeds the number of storage units (YES in step S1409), the CPU 120 advances the processing to step S1410. This means that sheets of a size required for printing are not set in any of the sheet feeding cassettes which have the size detection ability and are provided in the MFP 102.

In step S1410, the CPU 120 determines the manual feeding tray as the storage unit to be used for printing.

After completion of the processing in step S1410, the CPU 120 advances the processing to step S1108 in FIG. 9.

The above-described control allows the automatic sheet selection function to select a sheet storage unit with priority on a sheet storage unit (i.e., a second sheet storage unit) that can detect the size of stored sheets over a sheet storage unit (i.e., a first sheet storage unit) that cannot detect the size of stored sheets.

Accordingly, generation of an image defect and output of a print product not intended by the user can be prevented.

The equipped sheet feeding cassette without size detection ability may also be regarded as a sheet storage unit with the size detection ability if, after confirming the size of a conveyed sheet, the sheets in that sheet feeding cassette are not changed. Accordingly, an opportunity to use the sheet storage unit of which distance to the image forming unit 403 is nearer increases, and thus print efficiency can be improved.

When the sheet storage unit to be used for printing is determined in the manner described in the above exemplary embodiment and, after starting the printing, the remaining sheet amount in the sheet storage unit becomes a predetermined amount, the CPU 120 may perform the control as follows. By performing the processing in step S1103 and subsequent steps, the CPU 120 determines a sheet feeding source again, switches the sheet feeding source to the determined sheet storage unit, and prints an image on a sheet supplied from the sheet storage unit.

According to the above-described exemplary embodiment, the MFP 102 is originally equipped with sheet storage units that cannot detect the size of a sheet and, to the MFP 102, sheet storage units that can detect the size of a sheet can be added as an optional device. The MFP 102 can perform the control as follows. That is, the MFP 102 is originally equipped with sheet storage units that cannot detect the size of a sheet and, to the MFP 102, a sheet storage unit (i.e., a third sheet storage unit) that cannot detect the size of a sheet may be added as an optional device. In a case where a sheet storage unit that cannot detect the size of a sheet is added, the CPU 120 of the MFP 102 may select a sheet storage unit to be used for printing from among the originally equipped sheet storage units and the added sheet storage unit, with priority on the sheet storage unit nearer to the image forming unit.

Further, according to the above-described exemplary embodiment, the MFP 102 including two types of sheet storage units, one that can detect the size of a sheet and the other that cannot is described as an example. However, the present invention is not limited to this example and is applicable also to a case in which the MFP 102 includes two types of sheet storage units, one that can detect the type of a sheet and the other that cannot. In that case, the CPU 120 of the MFP 102 performs control to select with priority on the sheet storage unit that can detect the type of stored sheets over the sheet storage unit that cannot detect the types of stored sheets. Accordingly, the possibility in which an image is printed on a sheet not intended by the user can be reduced.

Although an example of processing for executing a copy job is described in the above-described exemplary embodiment, the CPU 120 may perform the above processing for a print job and a facsimile job.

Although the processing in step S1107 may be performed for any of a copy job, a print job, and a facsimile job if the automatic sheet selection function is selected and the optional device is connected, the present invention is not limited to this processing mode. For example, the CPU 120 may perform the processing in step S1107 only when a received job is a facsimile job. The reason is as follows. An image included in a facsimile job is deleted after it is printed and, therefore, if an image defect or a print result not intended by the user is generated, the user must request the image sender to resend the image.

To address this issue, when the received job is a non-facsimile job and printing is performed for a non-facsimile job, the CPU 120 may perform the processing in step S1106 for the job even if the automatic sheet selection function is selected and the optional device is connected. According to this processing, the sheet storage unit having the size detection ability may be used preferentially when a facsimile job is performed, thereby minimizing the generation of an image defect. On the other hand, in a case where another job is performed, a sheet is fed from a sheet storage unit nearer to the image forming unit, so that productivity can be improved.

Further, according to the above-described exemplary embodiment, a sheet storage unit which has a size detection sensor is considered a sheet storage unit having the size detection ability while a sheet storage unit which does not have a size detection sensor is considered a sheet storage unit without the size detection ability. However, the present invention is not limited to this definition of sheet storage units. For example, when a sheet is conveyed, a sheet size can be detected by measuring the duration required for the sheet to pass through the sheet detection sensor and by calculating the product of the duration and the conveyance speed. Therefore, a sheet storage unit whose distance to the image forming unit 403 is long and which can detect the size of a sheet until the sheet reaches the image forming unit 403 may be considered a sheet storage unit having the size detection ability. In that case, a sheet storage unit which cannot detect the size of a sheet until the sheet reaches the image forming unit 403 may be considered a sheet storage unit without the size detection ability. Instead of calculating the product of the duration and the conveyance speed, the sheet size may also be detected based on a table containing the correspondence between the duration required for a sheet to pass through the sheet detection sensor and the size corresponding to that duration. A sheet detection sensor may be basically positioned near to each sheet storage unit as illustrated by the sensors S1 and S2 in FIG. 2, and may be combined with a jam detection sensor. Further, a sheet detection sensor may also be provided only at a position where sheets conveyed from all sheet storage units pass as illustrated by the sensor S2 in FIG. 2 to reduce the number of sheet detection sensors.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2012-129886 filed Jun. 7, 2012, which is hereby incorporated by reference herein in its entirety.

What is claimed is:

1. A printing apparatus having a plurality of sheet storage units, the printing apparatus comprising:
   a storing unit configured to store, for each of the plurality of sheet storage units, information indicating whether or not a sheet storage unit is provided with a sensor for detecting a size of sheets; and
   a selecting unit configured to select, as a sheet feeding source for printing and by referring to the information stored in the storing unit, a sheet storage unit which is provided with the sensor with precedence over a sheet storage unit which is not provided with the sensor, even in a case where a size of sheet stored in the sheet storage unit which is provided with the sensor and a size of sheet stored in the sheet storage unit which is not provided with the sensor are the same,
   wherein at least a part of the selecting unit is implemented by a processor and a memory.

2. The printing apparatus according to claim 1, wherein the selecting unit is configured to not select a first sheet storage unit which has stored a sheet having a size different from a size of sheet to be used for printing, even when the first sheet storage unit is provided with a sensor for detecting the size of sheets.

3. A printing apparatus having a plurality of sheet storage units, the printing apparatus comprising:
   a storing unit configured to store, for each of the plurality of sheet storage units, information indicating whether or not a sheet storage unit is provided with a sensor for detecting a type of sheets; and
   a selecting unit configured to select, as a sheet feeding source for printing and by referring to the information stored in the storing unit, a sheet storage unit which is provided with the sensor with precedence over a sheet storage unit which is not provided with the sensor, even in a case where a type of sheet stored in the sheet storage unit which is provided with the sensor and a type of sheet stored in the sheet storage unit which is not provided with the sensor are the same,
   wherein at least a part of the selecting unit is implemented by a processor and a memory.

4. A method for controlling a printing apparatus having a plurality of sheet storage units, the method comprising:
   storing, for each of the plurality of sheet storage units, information indicating whether or not a sheet storage unit is provided with a sensor for detecting a size of sheets; and
   selecting, as a sheet feeding source for printing and by referring to the stored information, a sheet storage unit which is provided with the sensor with precedence over a sheet storage unit which is not provided with the sensor, even in a case where a size of sheet stored in the sheet storage unit which is provided with the sensor and a size of sheet stored in the sheet storage unit which is not provided with the sensor are the same.

5. A non-transitory computer readable storage medium storing a computer program to cause a printing apparatus having a plurality of sheet storage units to perform a method, the method comprising:
   storing, for each of the plurality of sheet storage units, information indicating whether or not a sheet storage unit is provided with a sensor for detecting a size of sheets; and
   selecting, as a sheet feeding source for printing and by referring to the stored information, a sheet storage unit which is provided with the sensor with precedence over a sheet storage unit which is not provided with the sensor, even in a case where a size of sheet stored in the sheet storage unit which is provided with the sensor and a size of sheet stored in the sheet storage unit which is not provided with the sensor are the same.

6. A method for controlling a printing apparatus having a plurality of sheet storage units, the method comprising:
   storing, for each of the plurality of sheet storage units, information indicating whether or not a sheet storage unit is provided with a sensor for detecting a type of sheets; and
   selecting, as a sheet feeding source for printing and by referring to the stored information, a sheet storage unit which is provided with the sensor with precedence over a sheet storage unit which is not provided with the sensor, even in a case where a type of sheet stored in the sheet storage unit which is provided with the sensor and a type of sheet stored in the sheet storage unit which is not provided with the sensor are the same.

7. A non-transitory computer readable storage medium storing a computer program to cause a printing apparatus having a plurality of sheet storage units to perform a method, the method comprising:

storing, for each of the plurality of sheet storage units, information indicating whether or not a sheet storage unit is provided with a sensor for detecting a type of sheets; and selecting, as a sheet feeding source for printing and by referring to the stored information, a sheet storage unit which is provided with the sensor with precedence over a sheet storage unit which is not provided with the sensor, even in a case where a type of sheet stored in the sheet storage unit which is provided with the sensor and a type of sheet stored in the sheet storage unit which is not provided with the sensor are the same.

* * * * *